June 7, 1955
C. V. MILLIKAN
2,709,897
VALVE RESPONSIVE TO CONDENSER PRESSURE FOR
CONTROLLING WATER SUPPLY TO CONDENSER IN
REVERSIBLE COOLING AND HEATING SYSTEM
Filed May 3, 1954
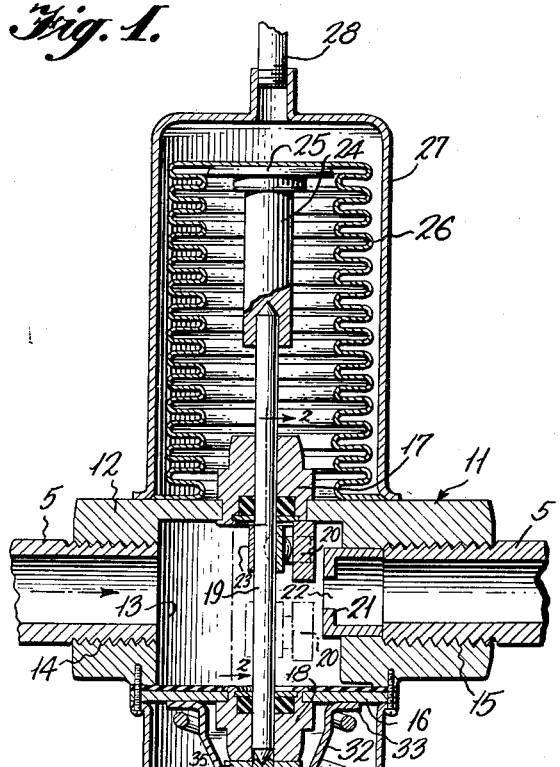
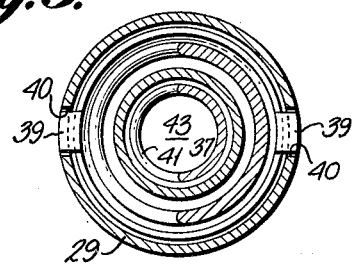
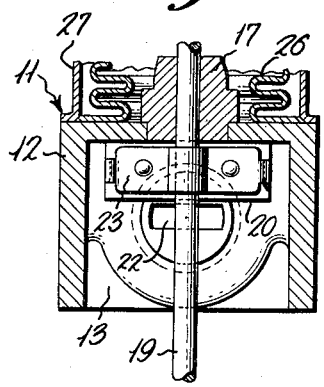
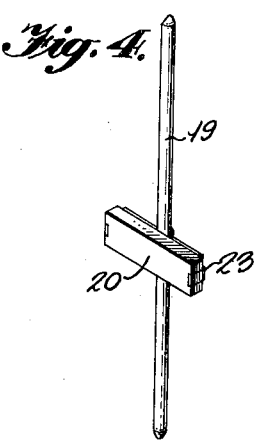
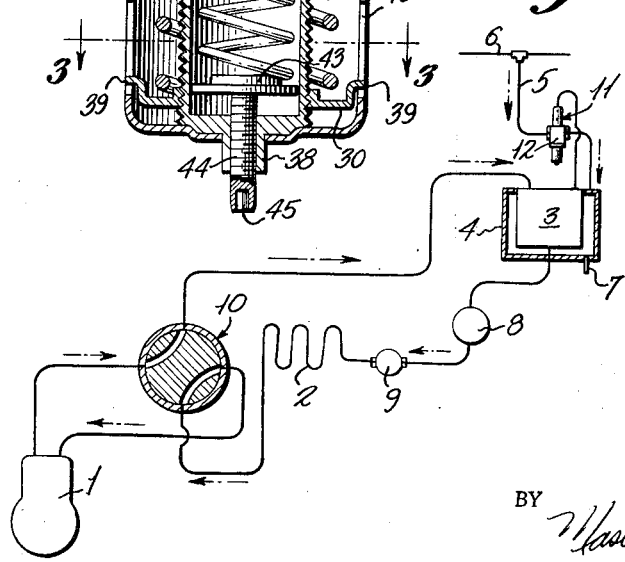
INVENTOR
*C. V. Millikan*
BY *Mason, Fenwick & Lawrence*
ATTORNEYS

United States Patent Office 2,709,897
Patented June 7, 1955

2,709,897

VALVE RESPONSIVE TO CONDENSER PRESSURE FOR CONTROLLING WATER SUPPLY TO CONDENSER IN REVERSIBLE COOLING AND HEATING SYSTEM

Clifford V. Millikan, Leesburg, Fla.

Application May 3, 1954, Serial No. 427,102

4 Claims. (Cl. 62—3)

This invention relates to a water regulating valve particularly designed for use in that type of air conditioning apparatus in which the high and low sides of the compressor are reversible with respect to the condenser and evaporator, whereby the hot compressed gas which is fed from the compressor to the condenser during the cooling phase of the evaporator is supplied to the evaporator from the condenser through the compressor upon reversal, changing the evaporator to a heating instrumentality. In such a system, the condenser is of the water cooled type. During the cooling phase the water extracts heat from the compressed gas in the condenser, assisting condensation, while during the heating phase the low side of the compressor is connected to the condenser, creating evaporation of the gas in the condenser, with consequent lowering of its temperature so that heat is extracted from the water and transferred to the evaporator, the compressor acting as a heat pump. It is obvious that when the condenser is under high pressure conditions, the amount of cooling water supplied should be regulated in direct ratio to the pressure, and that also when the evaporator is operating under conditions of low pressure, the supply of water should be regulated in inverse ratio to reduction in pressure, since the lower the pressure, the greater is the temperature differential and the greater the capacity of the condenser to absorb useful heat from the water.

In known systems of the above type there is a valve for regulating the water supply to the condenser during the cooling phase, which modulates responsive to pressure variations in the condenser within a high pressure range, and another valve for regulating the water supply to the condenser during the heating phase, which responds to pressure variations in the condenser within a low pressure range. The employment of two valves not only involves the expense of the second valve, but greatly complicates the connections incidental to their installation.

The present invention has for its general object the provision in an alternative cooling and heating system of the type described, of a single valve responsive to pressure within the condenser, which performs the functions of both valves heretofore found necessary.

More specifically stated, it is an object of the invention to provide a single water regulating valve in the type of heat exchange system described, operating responsive to pressure in the condenser, which automatically selects a high pressure range of modulative control of the water supplied when the system is in its cooling phase, within which range the water is supplied in direct ratio to pressure variations, or a low pressure range when the system is in its heating phase, within which water is supplied in inverse ratio to variations in pressure.

Other objects of the invention will appear as the following description of a practical embodiment thereof proceeds.

In the drawing which accompanies and forms a part of the following specification, and throughout the figures of which the same reference characters have been employed to denote identical parts:

Figure 1 is a longitudinal sectional view of a water regulating valve embodying the principles of the invention;

Figure 2 is a section taken along the line 2—2 of Figure 1;

Figure 3 is a cross-section taken along the line 3—3 of Figure 1;

Figure 4 is a perspective view of the slide block and stem;

Figure 5 is a diagrammatic view showing the position of the water regulating valve in a system for which it is adapted.

Referring now in detail to the several figures, and first to Figure 5, a conventional heat exchanging system is shown such as is employed in an air conditioner, comprising the compressor 1 which in its cooling phase draws spent gaseous refrigerant from the evaporator 2, compresses it and sends it forward to the condenser 3. Condensation is assisted by cool water entering the jacket 4 through a branch 5 from the water main 6, the water discharging from the jacket through a drain 7. The condensed refrigerant passes to a receiver 8, thence through an expansion valve 9 to the evaporator.

The 4-way valve 10 permits the compressor connections to be reversed relative to the evaporator and condenser so that the compressor draws from the condenser reducing the pressure, and pumps hot compressed gas into the evaporator which now functions as a heater not only in view of the heat generated by compression, but also the heat withdrawn from the water in the condenser. When the high side of the compressor is connected direct to the condenser the pressure in the condenser may be, for example, of the order of 130 to 150 pounds per square inch, while when the low side of the compressor is connected to the condenser, the pressure may be of the order of 35 to 50 pounds per square inch. The water regulating valve 11 is shown interposed in the water branch 5, and a pressurestat from the valve is connected into the head of the condenser.

When the 4-way valve 10 is moved to reverse the compressor, the pressure within the condenser at once shifts from one extreme to the other and the water regulating valve of the present invention is designed to adjust itself according to the pressure to which it is subjected and to assume the modulated regulation of the water supplied to the condenser within the range determined by that pressure.

Now referring to the structure of the water regulating valve per se, it comprises a body 12 which is a water conduit having the intermediate chamber 13 and threaded inlet and outlet bores 14 and 15 into which the sections of the branch pipe 5 are adapted to be screwed. Opposite sides of the body 12 are flat and parallel.

The lower flat side is a plate 16 removable to give access to the chamber 13. Both the upper and lower flat sides of the body 12 carry axially aligned bushings 17 and 18, through which a valve stem 19 smoothly slides, intersecting the chamber 13. A slide valve 20 is mounted on said stem at an intermediate point and cooperates with a planiform valve seat 21 surrounding a port 22, which communicates with the eduction side of the pipe 5. Said slide valve is a fiber block having slide and guide connections at its ends, with a frame 23 fixed to said valve stem so that the water pressure upon the back of said block keeps is forced against the valve seat without putting any lateral stress on the valve stem.

The upper part of the valve stem 19 fits into a recess in the lower end of a plunger 24, having a flat head 25. A bellows type capsule 26 overlies the upper part of the valve stem and the plunger 24, and this in turn is enclosed within a casing 27. Both the bellows 26 and the casing 27 are secured in fluid tight manner to the upper flat side of the body 12, and the casing acts as a pressure cylinder for the bellows, since it is in communication by means of the tube 28 with the head of the condenser, as indicated in Figure 5.

A removable housing 29 is secured to the plate 16, preferably by the same screws that fasten said plate to the body 12. Within the housing 29, adjacent the bottom thereof, is a spring supporting disk 30. A coil spring 31 rests upon this disk. A dished washer 32 is mounted upon the upper end of the spring 31, having its central dished portion telescoped within the spring, and having a peripheral flange 33 that rests upon the end of the spring. A thimble 34 is carried by said washer, having a portion that projects through the central hole in said washer and a peripheral flange 35 which retains it. The upper end of the dished washer 32 is against the plate 16 pressed by the spring 31. A stud 36 is screwed upward in the thimble 34 into contact with the lower end of the valve stem 19, and forms an adjustment so that there can always be pressure of the spring 31 transmitted through the stud, valve stem, and plunger against the top of the bellows.

The pressure of the spring 31 can be adjustably varied by raising or lowering the supporting disk 30. Said disk is threaded on a cup-shaped cylindrical fitting 37 which seats in a depression in the lower end of the housing 29 and has a polygonal boss 38 projecting through a hole in the bottom of said housing, and by means of which the fitting 37 may be turned. The disk 30 is nonrotatable by virtue of the opposite lugs 39 which play in longitudinal slots 40 in the housing. When the fitting 37 is turned, the disk 30 rises or falls, as the case may be, effecting the desired adjustment of the spring 31.

A second spiral spring 41 is positioned within the fitting 37. It is closed at both ends by peripherally flanged disks 42 and 43, the reduced parts of which extend within the spring, and the flanges of which rest upon the opposite ends of the spring. The disks have a sliding fit within the fitting 37, the upper edge of the latter being peened over so as to engage the upper disk 42 and limit the expansion of the spring 41. When the cooling-heating system is in its heating phase, the head of the stud 36 is out of contact with the disk 42. The lower disk 43 seats upon the inner end of an adjusting screw 44 which is threaded in a bore through the boss 38, and as shown, has an Allen socket 45 in its lower end.

The function of the springs will appear in the course of the description of the operation of the valve.

Referring to Figure 1, the valve is in the position assumed when the evaporator is at the beginning of its heating phase. The pressure within the condenser and within the casing 27 is at its minimum. The bellows is at the height of its expansion, as are also the springs 31 and 41. The valve 20 is in its extreme upward position so that port 22 is open to its fullest extent and the passage of water through the pipe 5 is at its maximum rate. During the heating phase the condenser pressure may vary in response to a number of factors. For example, as the room heated by the evaporator warms up, the rate of heat loss from the evaporator diminishes and the gas returned to the condenser is relatively warm. Increase in condenser pressure transmitted to the casing 27 contracts the bellows, moving the valve 20 downward in a closing direction proportionately reducing the rate of flow of water through the condenser. The valve is in its mean closed position when it is over the port 22, with its transverse middle line coinciding with the transverse middle line of the port. The movement of the valve within the low pressure area is controlled solely by the spring 31, the tension of which is relatively light, and opposes the contraction of the bellows sufficiently to cause the valve slowly to move towards closed position as pressure increases, thus providing a practical range of regulation of the water supply to the condenser, in inverse ratio to the increase in condenser pressure.

The spring 41 is relatively stiff. It is designed to regulate the movement of the valve when the system is in its cooling phase and the condenser consequently within the high pressure area. When the 4-way valve 10 is turned to change the system from the heating to the cooling phase, there is a rise in condenser pressure, due to the cutting off of the low side of the compressor from the condenser and the connecting of the high side of the compressor to the condenser, which contracts the bellows sufficiently to bring the stud 36 into contact with the disk 42, and compressing the spring 41 until the combined pressure of springs 30 and 41 balance the compression pressure movement of the valve is controlled primarily by the spring 41, but assisted in a slight measure by the spring 31.

The valve 20 remains closed from the point of maximum pressure within the low pressure range, to the point at which the spring 41 begins to yield to minimum pressure within the high pressure range. Within the latter area, the valve opens progressively responsive to increase in pressure, and therefore, regulates the flow of water to the condenser in direct ratio to variations in the condenser pressure.

While I have in the above description disclosed what I believe to be a practical embodiment of the invention, it will be understood by those skilled in the art that the specific details of construction and arrangement of parts, as shown and described, are by way of example and not to be construed as necessarily limiting the scope of the invention.

What I claim is:

1. Pressure responsive water supply regulating valve comprising a body having a bore therethrough defining a valve chamber, a water inlet thereto and a water outlet therefrom, means in said chamber providing a valve seat, a port surrounded by said seat placing said inlet and outlet in inter-communication, a valve stem intersecting said chamber, a slide valve carried by said valve stem at an intermediate point in its length, cooperating with said seat, said valve stem and valve having an intermediate position in which said valve closes said port, and having positions on either side of said intermediate position in which said port is open respectively below and above said valve, a bellows operatively contiguous to the upper end of said valve stem, a spring reacting upwardly through said valve stem urging said bellows to expanded position in which said port is open below said valve, a casing about said bellows forming a pressure chamber adapted to be connected to a source of variable pressure, said spring being of such strength as to close said valve at the maximum pressure within a predetermined low pressure range and to regulate flow through said port responsive to pressure variations within said range, an auxiliary spring beneath the lower end of said valve stem of such strength as to begin to react materially upward through said valve stem when said valve has moved to closed position, said auxiliary spring being of such strength as to let said valve descend to open said port above said valve only under pressures in a selected high pressure range abruptly higher than pressures within said low pressure range, and to regulate flow through said port responsive to pressure variations within said high pressure range.

2. Pressure responsive water supply regulating valve as claimed in claim 1, including a housing enclosing said springs and fixed to said body, an externally threaded cup seated in the bottom of said housing, said auxiliary spring being within said cup, a supporting disk for said low pressure responsive spring threaded on said cup and having peripheral lugs playing in longitudinal slots in said housing, said cup having a polygonal boss projecting through a hole in the bottom of said housing whereby said cup may be rotated and said supporting disk reciprocated for adjusting said low pressure responsive spring, and an adjusting stud screwing through said boss for transmitting adjusting force to said auxiliary spring.

3. In combination with a closed refrigeration system including compressor, evaporator and condenser, the condenser being in heat exchanging relation with a regulated water supply, and the compressor being reversible with respect to its connection to the condenser and evaporator, a single valve for regulating the water supply to the condenser, responsive to variations within the low pressure range imposed upon the condenser when the compressor is drawing from the condenser, in inverse ratio to the pressure, and to variations within the high pressure range imposed upon the condenser when the compressure is delivering to the condenser, in direct ratio to the pressure, said valve comprising a body having a bore therethrough defining a valve chamber, a water inlet thereto and a water outlet therefrom, means in said chamber providing a valve seat, a port surrounded by said seat placing said inlet and outlet in intercommunication, a valve stem intersecting said chamber, a slide valve carried by said valve stem at an intermediate point in its length, cooperating with said seat, said valve stem and valve having an intermediate position in which said valve closes said port, and having positions on either side of said intermediate position in which said port is open respectively below and above said valve, a bellows operatively contiguous to the upper end of said valve stem, a spring reacting upwardly through said valve stem urging said bellows to expanded position in which said port is open below said valve, a casing about said bellows forming a pressure chamber adapted to be connected to a source of variable pressure, said spring being of such strength as to close said valve at the maximum pressure within a predetermined low pressure range and to regulate flow through said port responsive to pressure variations within said range, an auxiliary spring below the lower end of said valve stem of such strength as to begin to react materially upward through said valve stem when said valve has moved to closed position, said auxiliary spring being of such strength as to let said valve descend to open said port above said valve only under pressures in a selected high pressure range abruptly higher than said low pressure range, and to regulate flow through said port responsive to pressure variations within said high pressure range.

4. In a reversible heat exchanging system of the type including a water cooled condenser, having cooling and heating cycles obtained by reversing the low and high sides of the compressor with respect to the evaporator and condenser whereby in the heating phase, heat is obtained from the cooling water, means for controlling the flow of cooling water through the condenser directly proportional to condenser pressure during the cooling cycle and inversely proportional to compression pressure during the heating cycle, comprising a fitting in the cooling water supply pipe to said condenser having a valve seat and a port surrounded thereby providing communication through said fitting, a valve having a range of travel including an intermediate position in which it closes said port, and open positions in which it admits cooling water through said port respectively above and below said valve, a bellows deformable responsive to condenser pressure for moving said valve through its range of travel, a pair of springs opposing said bellows so arranged with respect to said valve that solely one resists the movement of said valve responsive to condenser pressures during the heating cycle while both aggregately resist movement of said valve during the cooling cycle.

References Cited in the file of this patent
UNITED STATES PATENTS

| | | |
|---|---|---|
| 2,066,161 | Roessler | Dec. 29, 1936 |
| 2,318,161 | Johnson | May 4, 1943 |